United States Patent [19]

McKinsey

[11] 4,197,668
[45] Apr. 15, 1980

[54] HOLDER FOR FISHING ROD

[76] Inventor: Joseph G. McKinsey, 3524 35th St., Sacramento, Calif. 95817

[21] Appl. No.: 904,661

[22] Filed: May 10, 1978

[51] Int. Cl.² ............................................. A01K 91/06
[52] U.S. Cl. ........................................... 43/15; 43/21.2
[58] Field of Search ............................. 43/15, 16, 21.2

[56] References Cited
U.S. PATENT DOCUMENTS

| | | | |
|---|---|---|---|
| 2,784,517 | 3/1957 | Mooney | 43/16 |
| 2,996,824 | 8/1961 | Faycosh | 43/16 |
| 3,055,135 | 9/1962 | Lewis | 43/15 |
| 3,205,606 | 9/1965 | Banta | 43/15 |
| 3,453,765 | 7/1969 | Gibbons | 43/15 |

Primary Examiner—Nicholas P. Godici
Attorney, Agent, or Firm—John L. McGannon

[57] ABSTRACT

An improved fishing rod holder comprised of a support having a bar pivotally mounted thereon for movement between two positions. The bar has a tube near one end thereof for receiving the butt end of a fishing rod and a U-shaped clip near the other end for receiving an adjacent portion of the fishing rod. When the bar is in one position, the fishing rod is inclined and when the bar is in the other position, the fishing rod is almost vertical. One or more springs bias the bar toward the other position. A latch releasably holds the bar in the one position and a solenoid coupled with the latch releases the latch and allows the bar to move quickly from the one position to the other position. A pivotal arm coupled with the switch in the circuit of the solenoid triggers the solenoid when the line on the fishing rod increases in tension. A lock is used to lock the bar in the one position for carrying purposes.

5 Claims, 3 Drawing Figures

U.S. Patent  Apr. 15, 1980  4,197,668
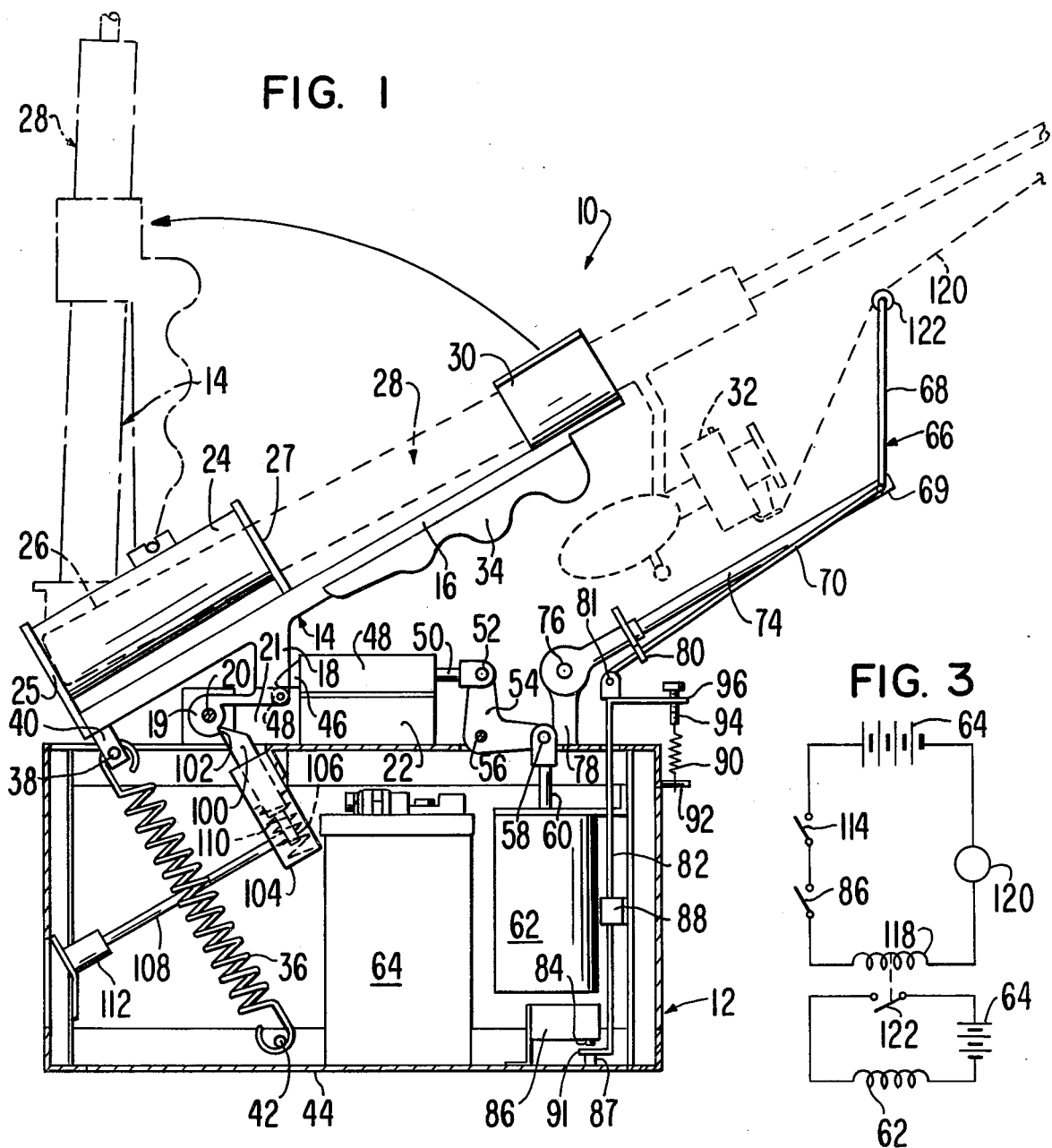
FIG. 1
FIG. 3
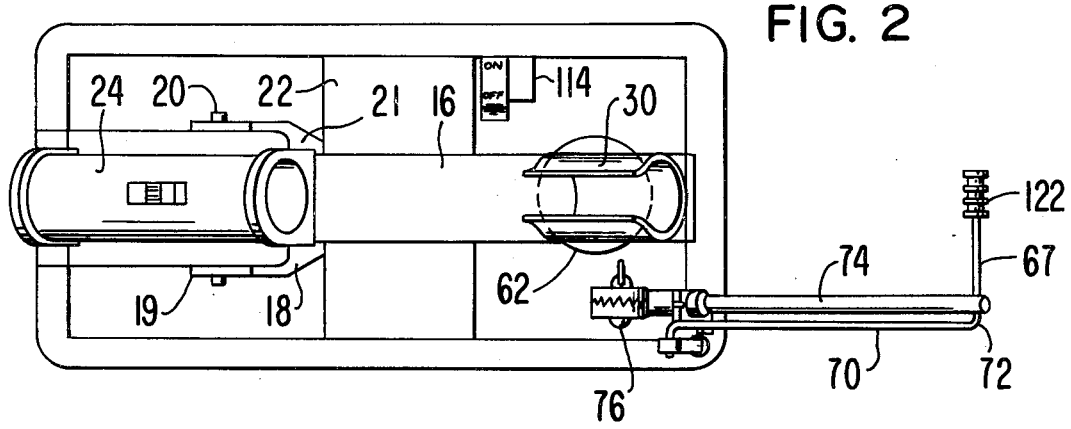
FIG. 2

HOLDER FOR FISHING ROD

This invention relates to improvements in the holding of fishing rods and, more particularly, to an improved fishing rod holder which automatically shifts the fishing rod when the line of the fishing rod increases in tension.

BACKGROUND OF THE INVENTION

Holders for fishing rods have been used in the past but, for the most part, they have either been too complicated for reliable operation or have been so simple that they are not operated automatically. It is desirable to not only provide a fishing rod holder which holds the pole while waiting for a fish to "bite" but it is also desirable that the holder be made so that it automatically shifts the fishing rod upwardly when a fish "bites". This assures that a fish will be caught without having to manually hold the rod and pull upwardly on it. Since prior holders do not have this dual capability, a need has arisen for an improved holder which does have this capability.

SUMMARY OF THE INVENTION

The present invention satifies the aforesaid need by providing an improved fishing rod holder which is simple and rugged in construction, can be operated without any particular skills, and automatically shifts the fishing rod held in the holder when a fish "bites" so that the fish is hooked and caught without manually holding the fishing rod itself. To this end, the holder of this invention includes a support which can be placed on the ground. A holder member for a fishing rod is pivotally mounted on the support and can move between two positions, namely, a first position in which the fishing rod held on the holder member is inclined and extends forwardly and outwardly from the support and a second position in which the fishing rod and holder member are almost vertical.

One or more springs bias the holder member toward the second position. A latch releasably holds the holder member in the first position and a solenoid is coupled to the latch. The holder member is released when the solenoid is actuated and pulls the latch away from the holder member. The solenoid is actuated when a switch in the circuit of the solenoid is tripped in response to an increase in the tension of the fishing line. This line tension increases when a fish "bites". This increase in tension is sensed by a pivotal arm also carried on the support. The arm engages the switch and trips it when the arm pivots on the support. A lock can be provided to releasably lock the holder member in the first position so that it can be carried by grasping the holder member.

The holder member itself can be in the form of a bar which is pivotally mounted near one end thereof on the support and has a tube for receiving the butt end of the fishing rod near the one end. The bar is provided with a U-shaped clip or part near the opposite end for receiving the adjacent portion of the fishing rod; thus, the fishing rod is held at two locations, namely at the butt end thereof and at a location spaced from the butt end, such as a location about twelve inches away from the butt end.

A primary object of this invention is to provide an improved fishing rod holder which is simple and rugged in construction, can hold a fishing rod in an inclined position yet it can shift the fishing rod when a fish "bites" on the line of the fishing rod, to hook the fish.

Another object of this invention is to provide a fishing rod holder of the type described wherein the holder is formed from a relatively few parts, can be hand-carried from place to place, and can be operated without any special skills.

Other objects of this invention will become apparent as the following specification progresses, reference being had to the accompanying drawing for an illustration of the invention.

IN THE DRAWING:

FIG. 1 is a side elevational view of the fishing rod holder of the present invention, showing a fishing rod in dash lines, with the fishing rod holder member in a cocked position (in full lines) and in a triggered position (in dashed lines);

FIG. 2 is a top plan view of the holder; and

FIG. 3 is a schematic wiring diagram of the circuitry used to trigger the holder member.

The fishing rod holder of the present invention is broadly denoted by the numeral 10 and includes a base frame 12 formed in any suitable manner, such as by angle iron. Holder 10 has a fishing rod holder member 14 comprised of a bar 16 having a bottom projection 18 provided with a bearing 19 pivotally mounted by a pin 20 on the outer end of a lateral projection 21 whose opposite end is secured to a cross piece 22 forming a part of frame 12. Bar 16 has a tube 24 mounted at one end thereof and the tube has a closed end 28 and an open end 27, the open end being adapted for receiving the but end 26 of fishing rod 28. A U-shaped clip 30 is mounted on bar 16 near the opposite end thereof for receiving the adjacent part of the fishing rod handle, the bar 16 being of a length sufficient to allow the reel 32 of fishing rod 28 to be forwardly of bar 16 and below the same as shown in FIG. 1, when holder member 14 is in the cocked (full-line) position of FIG. 1. A wooden handle part 34 is secured to the underside of bar 16 to facilitate the hand-carrying of holder 10 when holder member 14 is locked in the cocked position as will be described hereafter.

One or more coil springs 36 bias holder member 14 in a counter clockwise direction when viewing FIG. 1. Only one spring 36 is shown in FIG. 1 but a pair of such springs could be used if desired. The upper end of the spring is coupled to pin 38 on an ear 40 secured to bar 16 rearwardly of pin 20. The lower end of spring 36 is around a pin 42 secured to the bottom of 44 of frame 12.

A spring-biased latch 46 shiftably mounted in a housing 48 carried by cross piece 22 operates to releasably hold member 14 in the cocked position of FIG. 1. Latch 46 is biased outwardly of housing 48 and overlies and engages a roller 48 carried by projection 18, the latch being secured to a shaft 50 pivotally mounted by a pin 52 on a crank 54, the latter being pivotally mounted by a pin 56 on the upper part of frame 12 in any suitable manner. The crank is also connected by a pin 58 to the shaft 60 of a solenoid 62 carried in any suitable manner on frame 12 adjacent to a battery 64 resting on bottom 44 as shown in FIG. 1.

A crank-like triggering device 66 (FIG. 1) is used to actuate solenoid 62 to cause latch 46 to retract and thereby allow member 14 to rotate from the full-line, cocked position of FIG. 1 to the dashed-line, triggered position of FIG. 1. Device 66 is actuated in response to an increase in tension on the fishing line of fishing rod 28, such as when a fish nibbles on bait on a hook connected to the line. When this occurs, the fishing rod coupled to holder 14 is snapped or whipped upwardly to cause a fish on the line to be immediately snagged on the hook.

Device 66 includes a rigid wire comprised of a horizontal first part 67, a vertical second part 68, a horizontal third part 69 and an inclined fourth part 70. Third part 69 is pivotally mounted on the outer end of an inclined rod 74 releasably and adjustably secured by pin 76 to an upright stub shaft 78 secured to the upper part of frame 12. To this end, part 69 rotatably extends through an eyelet in the outer end of rod 74.

A guide 80 holds part 70 in the proper relationship to rod 74 but allows up and down movement of part 70, the lower end of part 70 being pivotally mounted by a pin 81 to the upper end of a generally vertical rod 82 which extends downwardly and engages the shiftable part 84 of an electrical switch 86 carried by frame 12. A guide 88 holds rod 82 in a vertical position and a stop 87 limits the downward movement of a foot 91 on the lower end of rod 82. Means for adjusting the force required to bias rod 82 downwardly includes a coil spring 90 secured at its lower end to a rigid side projection 92 on the frame and at its upper end to the lower end of a screw 94 threadably carried by a second projection 96 on rod 82.

Means for locking holder member 14 in the full-line position of FIG. 1 includes a latch 100 for engaging a shoulder 102 on bearing 19 as shown in FIG. 1. Latch 100 is mounted for shifting movement in a housing 104 in which a rotable cam 106 engages the end of the latch. A rod 108 rotates cam 106 to allow retraction of latch 100 under the bias force of a spring 110 in housing 104. A key-actuated lock 112 causes rotation of rod 108 and thereby cam 106 when a key is inserted in the lock and turned.

FIG. 3 shows a schematic diagram of the circuitry for operating holder 10. Battery 64 is in series relationship with a pair of switches 86 and 114, a relay coil 118 and a horn or light 120. The relay has a switch 122 in series with solenoid 62 and battery 64. Switch 114 is a manually actuated on/off switch which is closed when the device is put in use. Switch 86 is actuated in the manner to be described.

In use, holder member 14 is moved into the cocked position from the triggered position of FIG. 1. This is done by manually shifting member 14 in a clockwise direction in viewing FIG. 1 against the bias force of spring 36 until latch 46 moves over roller 48. The latch is provided with an inclined upper surface to allow for this since the normal position of the latch is as shown in FIG. 1. The fishing rod is then inserted into the holder as shown in FIG. 1 and rod 74 is adjusted so that part 68 is substantially vertical as shown in FIG. 1. Then the fishing line 120 is placed over a grooved roller 122 on the outer end of part 67 and screw 94 is adjusted for the proper tension on spring 90.

When a fish strikes the hook on line 120, the tension on the line will increase, causing device 66 to pivot about pin 72 in a clockwise sense when viewing FIG. 1. This will cause rod 82 to be raised, engaging shiftable part 84 on switch 86 and thereby closing the switch. This will provide current to the relay coil 118 (FIG. 3) which, in turn, will close switch 122 and energize solenoid 62 simultaneously with the sounding of horn 120. When the solenoid is energized, shaft 60 on the solenoid is pulled downwardly, causing crank 54 to pivot in a clockwise sense (viewing FIG. 1) about pin 56, thereby retracting latch 46. This will cause member 14 to immediately and quickly pivot in a counter-clockwise sense from the full-line position of FIG. 1 to the dashed-line position, thereby pulling fishing rod 28 upwardly in a vertical plane and causing the fish to be snagged and thereby caught on the hook with a snap-like action. The rod can then be lifted out of holder 14 and the line reeled in to bring the fish in to land. To place the holder 10 back in operation, holder member 14 is again manually moved into the inclined position of FIG. 1 and rod is placed back on holder member 14 with the line set on roller 122 in the usual manner.

To lock member 14 in the cocked position for handcarrying, a key is inserted into lock 112 to cause rotation of rod 108 so that cam 106 will force latch 100 in and against shoulder 102 as shown in FIG. 1. Then, holder 10 can be lifted by placing the hand around bar 16 in engagement with the part 34 and carried from place to place without fear of triggering member 14.

I claim:

1. A holder for a fishing rod having a line comprising: a frame defining a support, said frame having an upper part; a holder member for a fishing rod, said holder member including a rigid bar having a tube attached thereto near one end thereof, the tube having an open end for receiving the butt end of the fishing rod, the bar having a U-shaped element near the opposite end for receiving an adjacent part of the fishing rod when the butt end of the fishing rod is received in the tube; an L-shaped projection rigid at one end thereof to the bar intermediate the ends of the bar and extending downwardly therefrom; pin means pivotally mounting the outer end of the projection on the upper part of the frame to permit the bar to move from a generally inclined position to a generally vertical position and return; a latch shiftably mounted on the upper part of the frame and moveable along a rectilinear path into and out of a location in which the latch engages the projection at a location thereon intermediate the ends thereof to hold the bar in the first position; means biasing the latch into engagement with the projection; a solenoid carried by the frame below the upper part thereof; means coupling the latch to the solenoid to permit the latch to be shifted out of engagement with the projection when the solenoid is energized; a circuit including a switch and a source of electrical power, the circuit being coupled to the solenoid and being operable to energize the solenoid when the switch is actuated; a rod shiftably mounted on the frame and coupled with the switch for actuating the switch when the rod is shifted in one direction relative to the support; means adjustably biasing the rod in the opposite direction; and means including a crank-like triggering device coupled with the rod and adapted to be coupled with the line of the fishing rod for shifting the rod in said one direction in response to an increase in tension on the line.

2. A holder as set forth in claim 1, wherein is included means carried by the frame and coupled with the projection near its outer end for releasably locking the bar against movement out of the first position.

3. A holder for a fishing rod having a line comprising: a support; an elongated holder member for the fishing rod, said holder member having a generally L-shaped projection secured at one end thereof to the holder member intermediate the ends of the holder member, the projection extending outwardly form the holder member and having a lateral element intermediate the ends of the projection; means pivotally mounting the outer end of the projection on the support for movement of the holder member from a first position to a second position and return, the axis of pivotal movement of the projection being in a vertical plane passing through the holder member at a location intermediate its ends; a spring coupled with one end of said holder member for biasing the same toward said second position; a latch shiftably mounted below said holder member and moveable along a rectilinear path, said latch being engageable with said element for releasably holding the holder member in the first position, said latch being biased toward said element; a solenoid coupled with the latch for shifting the latch away from the element when the solenoid is actuated; and means responsive to an increase in tension on the line of the fishing rod for actuating the solenoid to cause movement of the latch away from the said element and to effect the release of the holder member by the latch, whereby the holder member will pivot under the influence of said spring from said first position to said second position.

4. A holder as set forth in claim 3, wherein is included means carried by the support and engageable with the outer end of the projection for releasably locking the holder member in the first position.

5. A holder as set forth in claim 3, wherein said element includes a roller, said latch having an inclined upper surface and a generally horizontal lower surface, the upper and lower surfaces being convergent as the outer end of the latch is approached.

* * * * *